United States Patent
Kaushik et al.

(10) Patent No.: US 7,769,938 B2
(45) Date of Patent: *Aug. 3, 2010

(54) PROCESSOR SELECTION FOR AN INTERRUPT IDENTIFYING A PROCESSOR CLUSTER

(75) Inventors: Shivnandan D. Kaushik, Portland, OR (US); Keshavan K. Tiruvallur, Tigard, OR (US); James B. Crossland, Banks, OR (US); Sridhar Muthrasanallur, Puyallup, WA (US); Rajesh S. Parthasarathy, Hillsboro, OR (US); Luke P. Hood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/850,790

(22) Filed: Sep. 6, 2007

(65) Prior Publication Data

US 2009/0070511 A1    Mar. 12, 2009

(51) Int. Cl.
  *G06F 13/24* (2006.01)
  *G06F 13/32* (2006.01)
(52) U.S. Cl. .................................... 710/268
(58) Field of Classification Search .......... 710/267–269
  See application file for complete search history.

(56) References Cited

U.S. PATENT DOCUMENTS

| | | | |
|---|---|---|---|
| 5,283,904 A | 2/1994 | Carson et al. | |
| 5,613,128 A | 3/1997 | Nizar et al. | |
| 5,724,527 A | 3/1998 | Karnik et al. | |
| 6,665,761 B1* | 12/2003 | Svenkeson et al. | 710/268 |
| 6,687,818 B1* | 2/2004 | Svenkeson et al. | 713/2 |
| 6,976,099 B2 | 12/2005 | George et al. | |
| 6,983,339 B1* | 1/2006 | Rabe et al. | 710/260 |
| 7,039,740 B2* | 5/2006 | Glasco et al. | 710/266 |
| 7,051,137 B2* | 5/2006 | Poisner | 710/260 |
| 7,089,341 B2* | 8/2006 | Kriegel | 710/266 |
| 7,191,349 B2 | 3/2007 | Kaushik et al. | |
| 7,222,203 B2 | 5/2007 | Madukkarumukumana et al. | |
| 7,363,394 B2* | 4/2008 | Shen et al. | 710/9 |
| 7,496,706 B2* | 2/2009 | Nguyen et al. | 710/269 |
| 2004/0015628 A1* | 1/2004 | Glasco et al. | 710/260 |
| 2004/0088460 A1* | 5/2004 | Poisner | 710/260 |
| 2004/0128563 A1* | 7/2004 | Kaushik et al. | 713/300 |

(Continued)

OTHER PUBLICATIONS

United States Patent Application, pending—not yet published, U.S. Appl. No. 11/618,456, filed Dec. 29, 2006, to Neiger et al.

(Continued)

*Primary Examiner*—Ryan M Stiglic
(74) *Attorney, Agent, or Firm*—Trop, Pruner & Hu, P.C.

(57) ABSTRACT

In some embodiments, an apparatus includes processor selection logic to receive logical destination identification numbers that are associated with interrupts each having a processor cluster identification number to identify a cluster of processors to which the interrupts are directed. The logical destination identification numbers are each to identify which processors within the identified cluster of processors are available to receive the corresponding one of interrupts. The processor selection logic is to select one of the available processors to receive the interrupt, and the selected one of the available processors is identified through a relative position of a corresponding bit in the logical destination identification numbers. Other embodiments are described.

22 Claims, 6 Drawing Sheets

U.S. PATENT DOCUMENTS

| | | | |
|---|---|---|---|
| 2005/0027914 A1 | 2/2005 | Hammalund et al. | |
| 2005/0125580 A1* | 6/2005 | Madukkarumukumana et al. | 710/200 |
| 2005/0228918 A1* | 10/2005 | Kriegel | 710/260 |
| 2006/0015668 A1* | 1/2006 | Nguyen et al. | 710/269 |
| 2006/0294277 A1 | 12/2006 | Tetrick | |
| 2007/0067521 A1* | 3/2007 | Shen et al. | 710/104 |
| 2007/0143514 A1 | 6/2007 | Kaushik et al. | |
| 2007/0157197 A1 | 7/2007 | Neiger et al. | |
| 2007/0239917 A1* | 10/2007 | Orita et al. | 710/268 |
| 2008/0162762 A1 | 7/2008 | Neiger et al. | |

OTHER PUBLICATIONS

United States Patent Application, pending—not yet published, U.S. Appl. No. 11/850,782, filed Sep. 6, 2007, to Kaushik et al.
Notice of Allowance for U.S. Appl. No. 11/850,782 dated Jul. 21, 2009.
Amendment dated Jun. 3, 2009 for U.S. Appl. No. 11/850,782.
Office action dated Mar. 18, 2009 for U.S. Appl. No. 11/850,782.
German Patent and Trademark Office, First Office Action dated Nov. 25, 2009, in German application No. 10 2008 035 120.2-53.
Korean Patent Office, Notice of Preliminary Rejection dated Mar. 22, 2010, in Korean patent application No. 10-2008-87954.

* cited by examiner

PROCESSOR SELECTION FOR AN INTERRUPT IDENTIFYING A PROCESSOR CLUSTER

BACKGROUND

1. Technical Field

Embodiments of the invention relate generally to interrupts for processors.

2. Background Art

An Advanced Programmable Interrupt Controller (APIC) is a programmable interrupt controller (PIC) that receives interrupt requests and provides interrupt outputs according to programmable procedures or priorities. Local APICs are used in processors (such as microprocessors). I/O APICs are used in chipset devices (such as an input/output (I/O) controller hub (ICH)) and peripheral devices. Examples of peripheral devices include device coupled to the ICH that are compatible with one of the Peripheral Component Interconnect (PCI) standards or one of the PCI Express (PCIe) standards such as the PCI Express® Base Specification Revision 2.0, Dec. 20, 2006, provided by the PCI-SIG®. An xAPIC is an extended APIC, which is similar to early APICs but with some additional features and in the xAPIC architecture, local and I/O APICs communicate through a system bus rather than through an APIC bus. A further Extended xAPIC includes additional extensions and features.

Processor packages may include more than one core, each of which may include more than one processor. Physical mode interrupts are interrupts for which an interrupting device designates a processor by a physical identification number or is broadcast to all processors. Logical mode interrupts are interrupts for which an interrupting device designates a processor or processors by a logical identification numbers or numbers. APIC interrupt deliveries include directed interrupts (single processor target), multi-cast (multiple processor target) and broadcast (all processors). In a lowest priority interrupt, a procedure is used to select a processor that is in the lowest processor priority to respond to the interrupt. Lowest priority may be decided in the chipset— often in an ad hoc fashion or with stale data of processor priority. Because the priority information is often not reliable, some chipsets merely select a particular processor (such as through a round robin technique) and provide the interrupt to that processor in a broadcast manner in which the other processors also receive the interrupts but do not respond to them.

The logical mode provides significantly greater flexibility in directed interrupts and is the mode used by Microsoft Windows & some Linux shrink-wrap operating systems. The logical mode of the xAPIC architecture provides an operating system software with flexibility in initializing the logical APIC identification number (ID), which is the unique identifier for each processor in the system. (The processors also have physical APIC IDs.) Other processors as well as devices or IOxAPICs use this ID to send interrupts to this processor. Given the flexibility in initialization of the logical xAPIC ID, there is no relationship between the actual physical topology of the platform and how the IDs are assigned. Although operating system initialization allows operating systems greater flexibility in grouping processors, at a platform level this complicates the routing of directed logical mode interrupts. Routing of logical mode interrupts is done through broadcasting the interrupts and having the local processor logic accept the interrupt if it matches its local APIC ID.

Having each processor check for every interrupt leads to both performance and power inefficiencies. For example, under a broadcast approach, each processor checks to see if the interrupt is directed to the processor although the processor is in a low power state. Since interrupts occur fairly often, it makes it difficult for a processor to stay in a deep low power state. Further, performance is reduced because there is traffic on interconnects in sending interrupts to packages for which the interrupt is not directed. Under one approach, an operating system has attempted to have a logical cluster of processors be for processors in the same package by assigning logical IDs in the order the processors are started. This approach provides only a partial solution if relied upon and broadcasting is still used. Accordingly, there remains a need for creating logical APICs that can be routed to processors in an efficient manner.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

In some embodiments, a system creates logical APIC IDs for each processor from the processor physical IDs. The logical APIC IDs include a processor cluster ID and a processor number within the cluster (intra-cluster ID). The logical APIC IDs are created such that all processors within a cluster are contained in the same processor package. This helps reduce traffic on interconnects because interrupts can be directed to only one processor package, rather than be broadcast to all processor packages. Further, this reduces power consumption because processors in other processor packages (or in some cases other clusters within the same processor package) do not receive the interrupts and, therefore, do not have to determine whether the interrupt is directed to them. In some cases, this prevents processors from having to come out of a sleep state.

In some embodiments, a logical destination identification number can include processors that are available to respond to an interrupt. Processor selection logic selects one of the available processors to receive the interrupt.

In the following discussion, physical APIC IDs are examples of physical processor identification numbers and logical APIC IDs are examples of logical processor identification numbers. Logical APIC ID creation logic is an example of logical identification number creation logic.

1. System Overview

Figure 1:
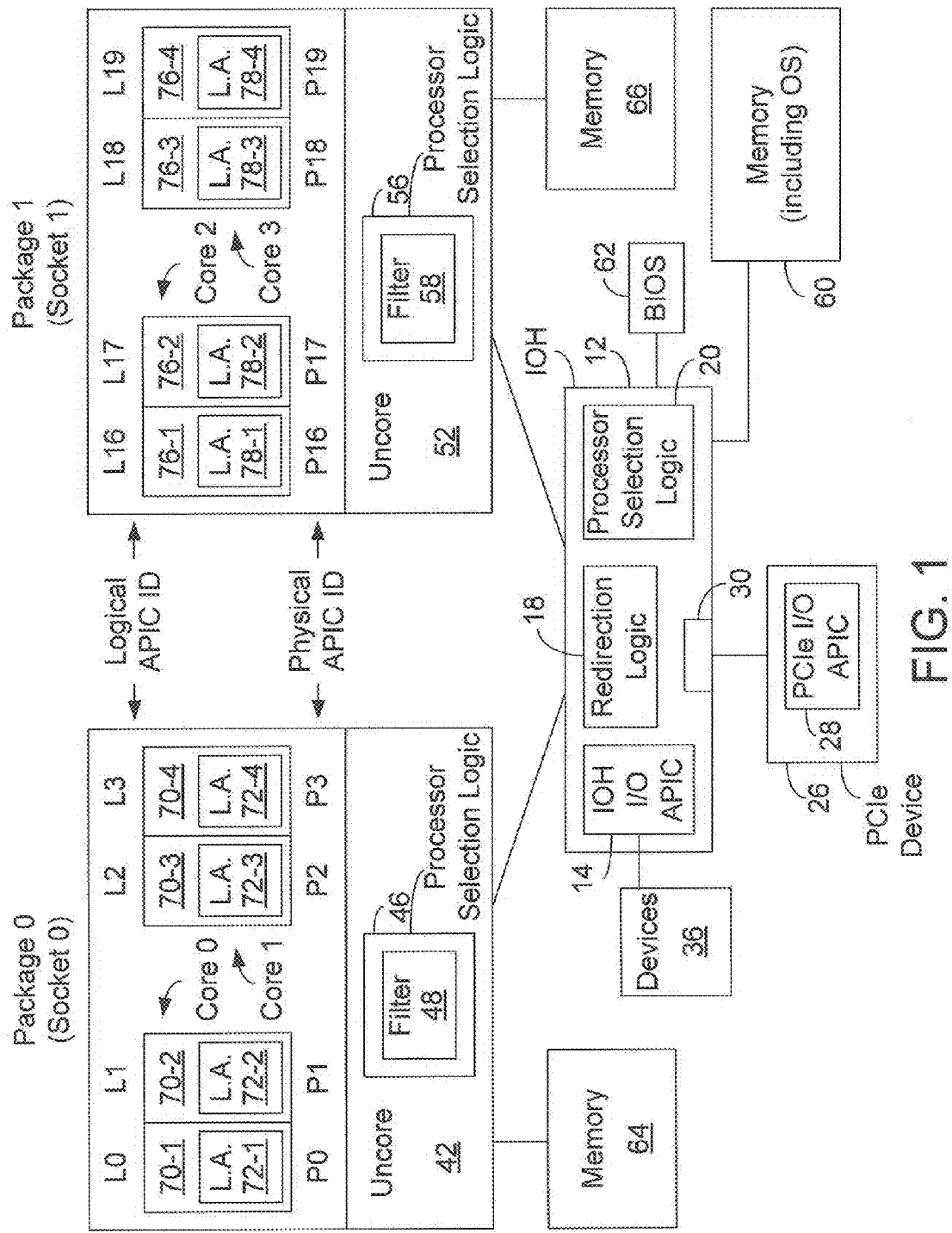
FIG. 1 is a block diagram representation of a system including multi-core processor packages, an input/output hub, and a device according to some embodiments of the inventions.

FIG. 1 illustrates a system that may be used in some embodiments of the inventions, but other embodiments may include systems that include different details. Referring to FIG. 1, a system includes multiple processor packages including at least a processor package 0 and a processor package 1 coupled to an input/output hub (IOH) 12. IOH 12 includes a IOH I/O APIC 14, redirection logic 18, and processor selection logic 20. A PCIe device 26 including a PCIe I/O APIC 28 is coupled to IOH 12 through interrupt interface circuitry 30. Devices 36 (such as a keyboard and a mouse) provide interrupts through IOH I/O APIC 14. IOH I/O APIC 14, I/O PCIe APIC 28, and local APICs 72-1 . . . 72-4 and 78-1 . . . 78-4 may be various types of APICs such as xAPICs or extended xAPICs. Alternatively, interrupt controllers other than APICs may be used.

Package 0 includes cores 0 and 1 and additional circuitry referred to herein as uncore 42. Core 0 includes processors 70-1 and 70-2, which include local APICs 72-1 and 72-2, respectively, and core 1 includes processors 70-3 and 70-4, which include local APICs 72-3 and 72-4, respectively. Package 1 includes cores 2 and 3 and additional circuitry referred to as uncore 52. Core 1 includes processors 76-1 and 76-2, which include local APICs 78-1 and 78-2, respectively, and core 3 includes processors 76-3 and 76-4, which include local APICs 78-3 and 78-4, respectively. Packages 0 and 1 will include various components not specifically illustrated. Memory 64 (such as main memory DRAM) is coupled to uncore 42, and memory 66 is coupled to uncore 52. Memory 60 (including a hard drive that holds an operating system (OS)) is coupled to IOH 12. There may be intermediate components between memory 60 and IOH 12. BIOS memory 62 is coupled to IOH 12.

Figure 6:
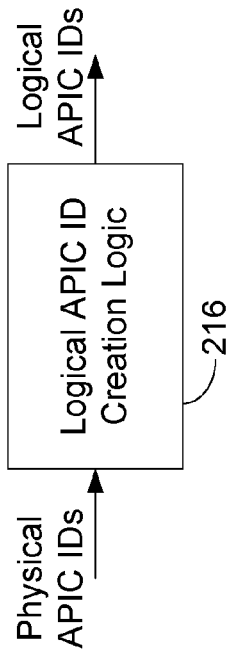
FIG. 6 is a block diagram representation of logical APIC ID creation logic.

"Processors 70-1, 70-2, 70-3, and 70-4 have physical APIC IDs P0, P1, P2, and P3, respectively. Processors 76-1, 76-2, 76-3, and 76-4 have physical APIC IDs P16, P17, P18, and P19, respectively. The logical APIC ID creation logic (in FIG. 6) provides logical APIC IDs L0, L1, L2, and L3 and L16, L17, L18, and L19 based on the physical IDs P0, P1, P2, and P3 and P16, P17, P18, and P19, respectively. (Of course, P0 . . . P4 and P16 . . . P19 and L0 . . . L3 and L16 . . . L19 represent ID bits and not the letter "P" or "L" and a number.) In some embodiments, packages 0 and 1 include more than two cores (see, for example, FIG. 8) and a core may include more than two processors. In the illustrated embodiment, there is a gap in physical IDs between P3 and P16 and in corresponding logical IDs between L3 and L16. A reason for this is that in these embodiments, a cluster includes IDs for sixteen processors, whether or not there are sixteen actual processors. A processor package may include one chip (die) or more than one chip. A processor package may include zero, one or more than one memory chips."

Redirection logic 18 receives a value (for example, a 16-bit value) from device 26 and provides an interrupt to package 0 or package 1. The decision of which processor to use to respond to an interrupt can be made in various places. For example, depending on the embodiment, the decision may be made in processor selection logic 20 in IOH 12, and/or in a processor selection sub-logic in an uncore (such as processor selection sub-logic 46 in uncore 42 or processor selection sub-logic 56 in an uncore 52). A filter 48 in sub-logic 48 and a filter 58 in sub-logic 56 may be used to filter out from consideration processors based on, for example, power states (c-states) and/or processor priority. A similar filter may be used in processor selection logic 20. In some embodiments, there is not a processor selection logic 20, but merely processor selection sub-logic.

Figure 2:
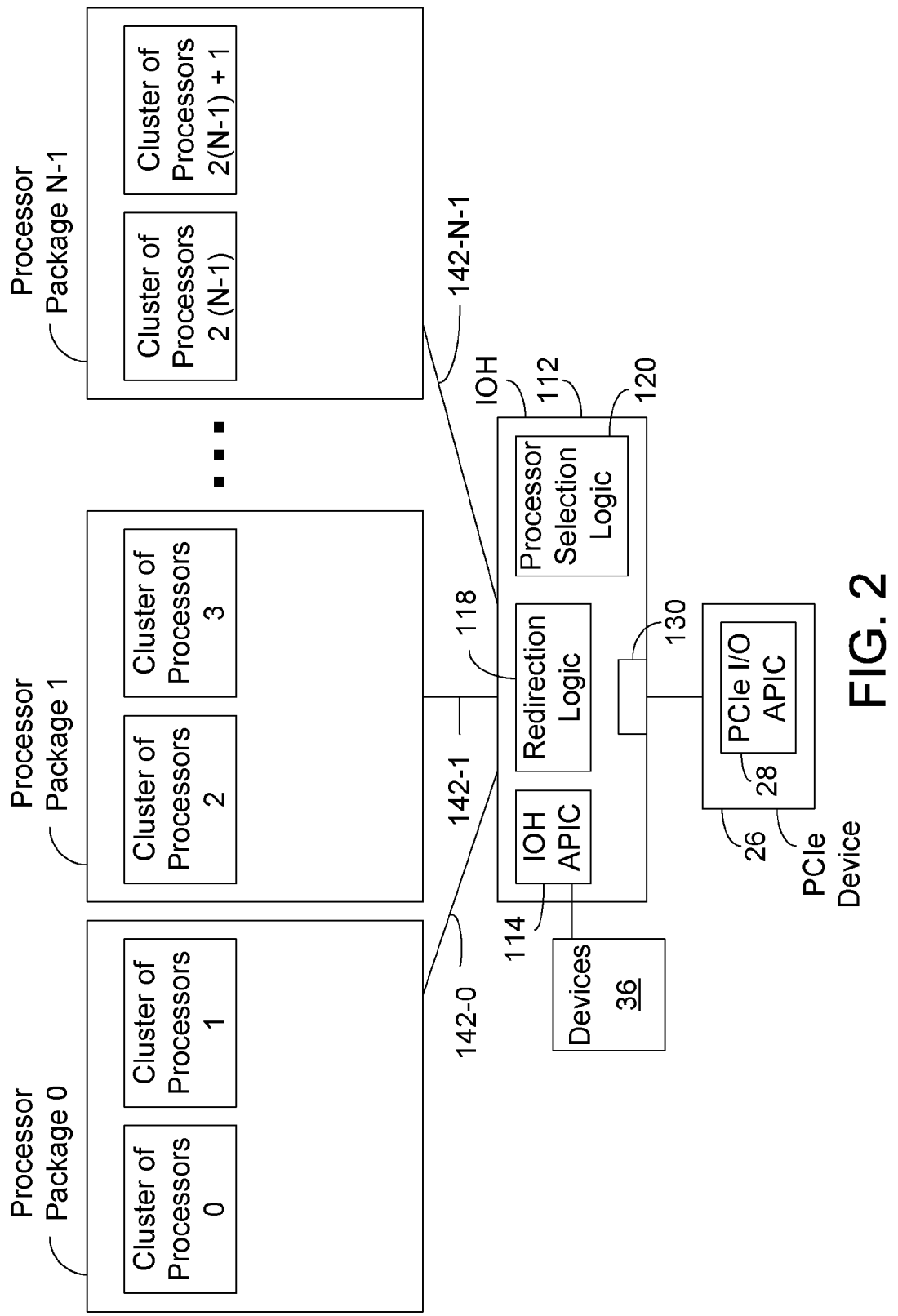
FIG. 2 is a block diagram representation of a system including multi-core processor packages, an input/output hub, and a device according to some embodiments of the inventions.

FIG. 2 is similar to FIG. 1 and illustrates an IOH 112 with a IOH APIC 114, redirection logic 118, processor selection logic 120, and interrupt interface circuitry 130 that may be similar to or identical to IOH APIC 14, redirection logic 18, processor selection logic 20, and interrupt interface circuitry 30 in FIG. 1. FIG. 2 also illustrates a processor package 0 including cluster of processors 0 and clusters of processors 1, a processor package 1 including cluster of processors 2 and clusters of processors 3, processor package N-1 including cluster of processors 2(N-1) and clusters of processors 2(N-1)+1. Processor packages 0, 1, . . . N-1 are coupled to IOH 112 through interconnects 142-0, 142-1 . . . 142-N-1. In some embodiments, there are separate interconnects to separate processors and in other embodiments there one set of interconnects is used for each processor package or one set of interrupts for each cluster. The cluster ID of an interrupt indicates which of the clusters is to receive the interrupt.

For example, assume that the cluster ID is 0000000000000010b (where b indicates binary). That would indicate cluster 2 is to receive the interrupt. This involves less power and involves less traffic on the interconnects as compared to an approach in which the interrupt is broadcast to all processors. The interrupt is not sent on interconnects 142-0 and 142-N-1 so there is less traffic on these interconnects which helps with bandwidth and reducing power. Also, processors in clusters 0, 1, 3, 2(N-1), and 2(N-1)+1 do not have to check whether the interrupt is directed to them, which reduces power (particularly where a processor must come out of a deep low power state to determine whether the interrupt is directed to it). There may also be less cache line traffic between processors in different clusters because of locality. Other embodiments may include even more clusters of processors in processor packages. Other components (such as uncores if included) are not shown in FIG. 2. There may be additional components such as bridges between the IOH and processor packages. Further, there may be more than one IOH in a system.

Figure 3:
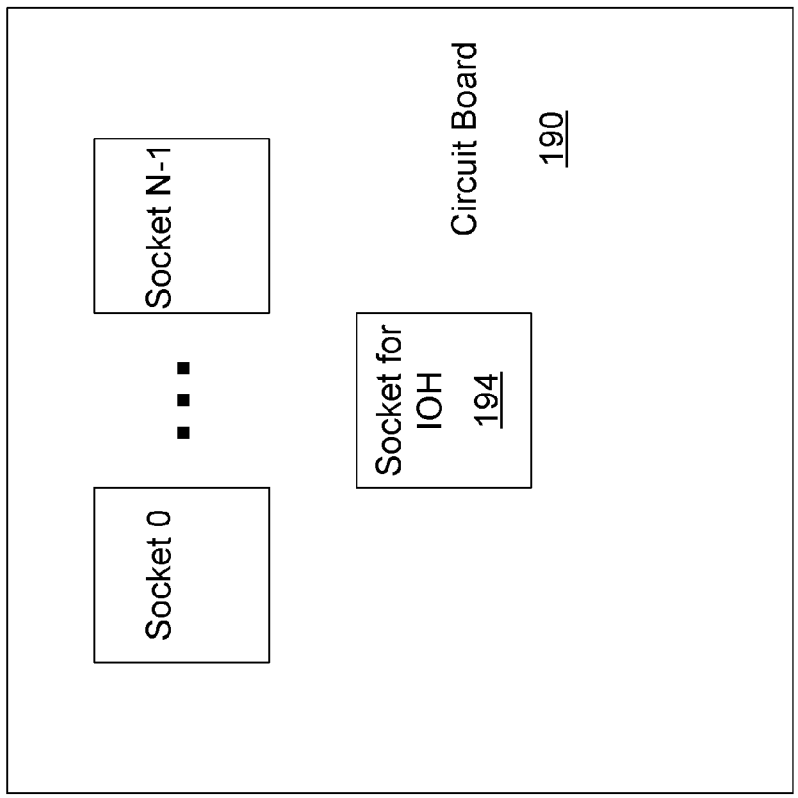
FIG. 3 is a block diagram representation of sockets on a circuit board for use in some embodiments of the inventions.

FIG. 3 illustrates a circuit board 190 (such as a printed circuit board) includes sockets including a socket 0 to receive a processor package 0, socket N-1 to receive a processor package N-1, and socket 194 to receive an IOH chip. In some implementations, circuit board 190 includes additional sockets for processor packages and for various other chips, but in other implementations, circuit board 190 includes only two sockets. As used herein, the term "socket" covers various techniques for coupling a chip or chips to a circuit board.

2. APIC ID Initialization

Figure 4:
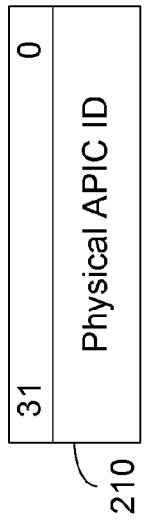
FIG. 4 is a block diagram representation of a physical APIC ID register for use in some embodiments of the inventions.

In some embodiments, the physical APIC IDs are statically initialized/latched by hardware and/or micro-code in, for example, coming out of reset and persists until the next power cycle. FIG. 4 illustrates a register 110 to hold a 32-bit physical APIC ID that in some embodiments is included in a corresponding local APIC.

Figure 5:
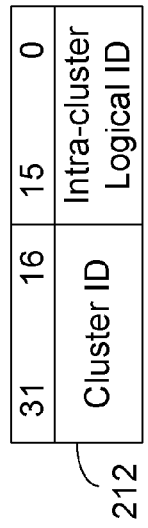
FIG. 5 is a block diagram representation of a logical APIC ID register for use in some embodiments of the inventions.

The logical APIC ID which is used in logical mode is partitioned into two fields—a 16-bit wide cluster ID and a 16-bit wide logical ID within the cluster of processors. The sixteen most significant bits of the logical ID contain the address or identification number of the destination cluster, while the lower sixteen bits identify an individual local APIC unit within the cluster. The logical ID portion may be a bit-mask with 1 bit per processor in the cluster—for example, bit 0 would be set for processor 0 in a processor cluster, bit 1 for processor 1 in the processor cluster, etc. FIG. 5 illustrates a register 112 to hold a 32-bit logical APIC ID, with bits 16 to 31 hold a cluster ID and bits 0 to 15 holding an intra-cluster logical ID. As a practical matter, many systems will have a small number of processor clusters such that, for example, only one or two bits needed to identify the cluster ID. In different embodiments, the remaining bits may be treated differently. For example, some of the bits are ignored in some systems and used in other systems.

Through the initialization algorithm there may be an established, persistent relationship between the logical APIC ID and the physical APIC ID based on platform topology. This provides the routing fabric with knowledge of the specific processor packages (sockets) to route interrupts to as opposed to doing a broadcast.

In the case in which a processor cluster may hold a limit of sixteen processors, if there are more than sixteen processors in a processor package, then there will be multiple clusters per package. If there are fewer than sixteen processors in a cluster, then a padding of APIC IDs may be used.

Logical APIC ID creation logic 216 creates logical APIC IDs from physical APIC IDs. The logical APIC ID creation logic 216 may be implemented in hardware, software, or microcode or a combination of them. The hardware may be in the uncore or local APIC or elsewhere. In some embodiments, the logical APIC ID is derived such that the lower 4-bits of the physical APIC ID are "decoded" (i.e. 1<<Physical APIC ID[3:0]) to provide a 16-bit logical ID within the cluster. The remaining 16-bits of the physical APIC ID then form the cluster ID portion of the logical xAPIC ID. The logical xAPIC ID is thus derived from the local xAPIC ID using the following formula:

Logical APIC ID = [(Physical APIC ID[19:4] << 16) || (1 << Physical APIC ID[3:0])]

In the formula, the symbol || means "OR" but could be replaced with addition and the same result would be achieved.

Figure 7:
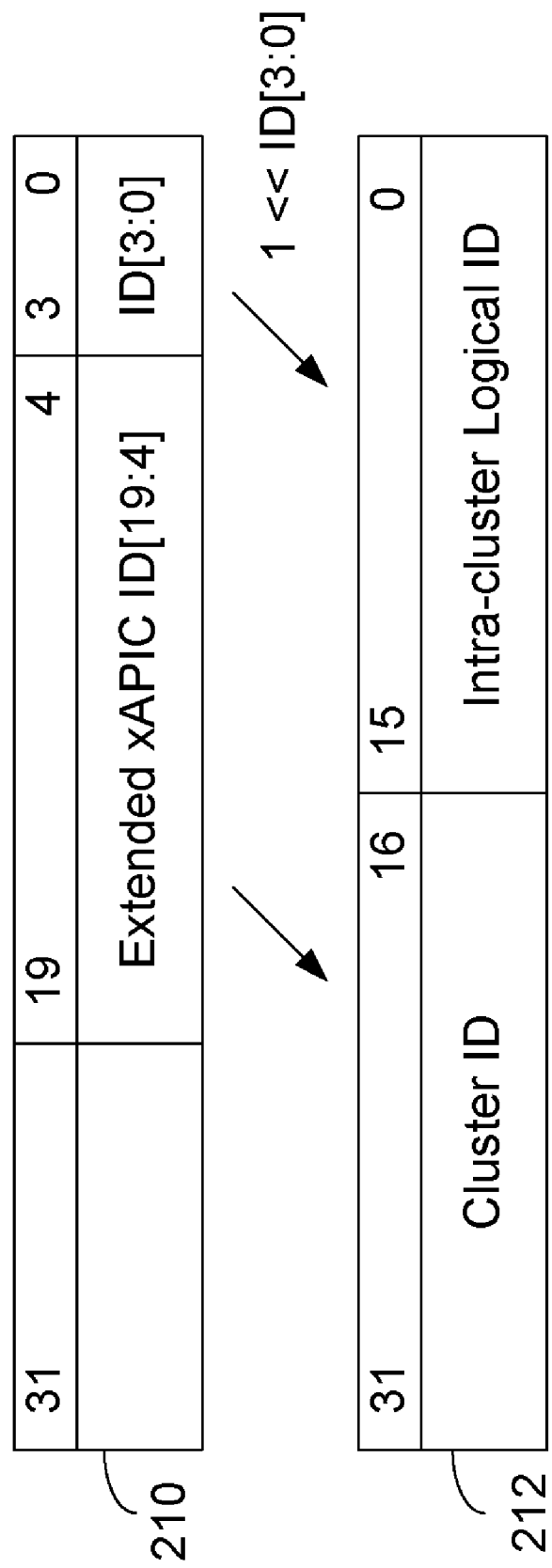
FIG. 7 illustrates generation of a logical APIC ID from a physical APIC ID for use in some embodiments of the inventions.

This formula can be re-stated in a similar way as follows:

Logical ID = (1 << Local xAPIC ID[3:0])   //Intra-cluster Logical ID
|| (Local xAPIC ID[19:4] << 16)   //Cluster ID FIG. 7 illustrates at example of the process of deriving logical APICs converting a physical APIC ID in register 210 to a logical APIC ID in register 212. Bits 20-31 may be ignored or used for various purposes.

Figure 8:
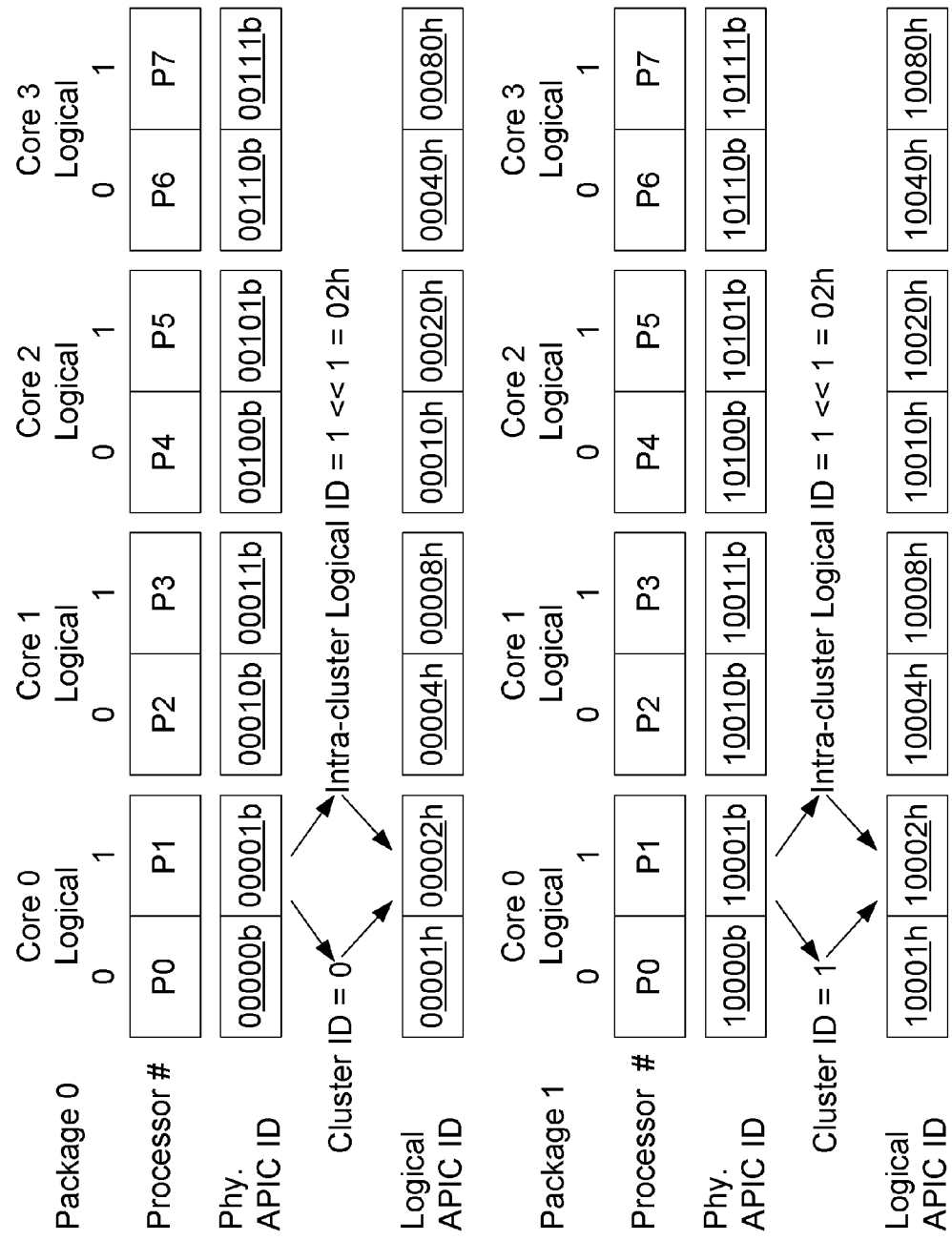
FIG. 8 illustrates physical and logical APIC IDs for a two socket system with four cores per package and two logical processors per core according to some embodiments of the inventions.

FIG. 8 shows an example of obtaining the logical APIC ID through the physical APIC ID in processor packages 0 and 1 each including four cores with two processor each. Since there are fewer than sixteen processors per package, there is only one cluster per package. Referring to package 0, the physical APIC ID for processor P0 is shown as 0<u>0000</u>b. The "b" is for binary. The first 0 is from a cluster ID and indicates the cluster is the one in package 0. To save space in the figure, other bits from the cluster ID are not illustrated in FIG. 8. The four underlined 0's are in the intra-cluster ID and indicate that the physical APIC ID is 0 (without listing all the zeros). Following the procedure discussed above, the logical APIC ID is created by starting with a "1" in the least significant bit (LSB) in an intra-cluster logical ID otherwise containing zeros and then shifting the "1" by an amount found in the first four bits of the physical ID. Since, the first four bits of the physical ID of processor P0 is 0000, the "1" is not shifted, and therefore the logical ID is 0001h (where "h" refers to hexadecimal). Hexadecimal is used to allow large numbers to be illustrated in FIG. 8. The cluster ID (0)remains the same as in bits 4-19 of the physical ID. In the case of processor P1, the four LSBs of the physical ID are 0001, so the "1" is shift by one bit such that the cluster ID is 0 for cluster 0 and the logical ID is 0002h which is caused by a 1 being shifted by one bit For example, in the case of processor P5, the "1" is shifted to the left by 5 bits which is 32 in decimal or 20 in hex. The same follows for the package 1 except that the cluster ID is 1 in both the physical and logical APIC IDs.

The initialization can happen at multiple points in time, for example, depending on the ease of implementation. Examples of when the initialization can occur including while coming out of reset when the physical APIC ID is initialized or at the time with the operating system first reads the logical APIC ID. The above algorithm with the padding of APIC IDs if needed may ensure that each APIC cluster is confined to a single processor package.

3. Processor Selection Logic and Redirection

Processor selection logic selects a processor to receive an interrupt from among available choices. Having a local APIC receive an interrupt is an example of a processor receiving the interrupt. In the prior art, processors have been chosen for interrupts through a lowest priority scheme. However, as is explained below, factors other than or in addition to the processor priority can be considered in deciding which processor is to receive the interrupt.

The operating system can select a cluster and at least one processor within cluster as being available for the interrupt. This information may be included directly or indirectly in the interrupt provided by a device such as device 26 in FIG. 1. For example, in a direct implementation, the interrupt may include a 16-bit field, one for each processor in the cluster in a bit mapped fashion (although there may be fewer than 16 processors in which case some bits might not be used). A processor that is available as a "1" in a position associated with that processor, such the position used in providing logical APIC IDs from physical APIC IDs in the formula discussed above and in FIG. 8. This can be called the logical destination ID. As an example, a logical destination ID bit mask could be 00101101, which indicates processors P0, P2, P3, and P5 are available for an interrupt. This assumes there are eight processors in a cluster, so the eight left most bits are not shown. Of course, the role of "0 and "1" could be reversed so a 0 represents a available processor and a 1 represents a processor that is not available. The processor selection logic discussed above can select which of the available processors is to receive the interrupt. Note that while typically only one processor receives an interrupt, in some cases an interrupt may be directed to more than one processor.

Figures 9, 10:
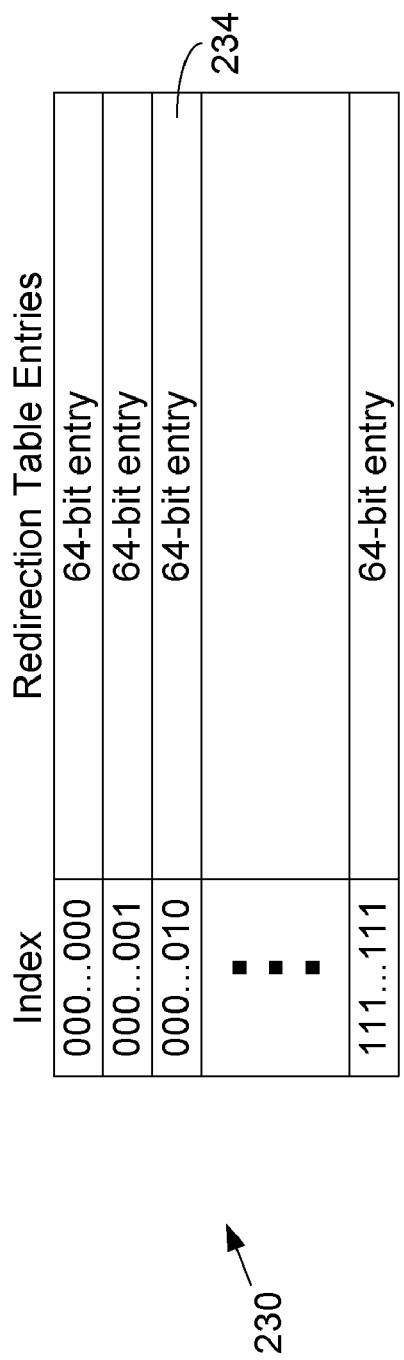
FIG. 9 is a block diagram representation of an APIC redirection table with multiple entries for use in some embodiments of the inventions.
FIG. 10 is a block diagram representation of an APIC redirection table entry for use in some embodiments of the inventions.

As an alternative, the interrupt from device 36 may include an index (such as a 16-bit index), which provides an index into a redirection table, that may be included redirection logic 19 of FIG. 1. Referring to FIG. 9, a redirection table 230 includes, for example, 64-bit entries for different index values. Entry 234 is an example. FIG. 10 shows details of example entry 234 according to some embodiments, but in other embodiments it may be different. Referring to FIG. 10, bits 48-63 indicate a cluster ID, which in the example of FIG. 10 indicates that a cluster 2 is to receive the interrupt. See example in connection with FIG. 2. Still referring to FIG. 10, the logical destination ID lists available processors for the processor selection logic (or sub-logic) to consider. The destination ID bit mask 011b indicates processors P0 and P1 are available and the other processors are not. Only three of the sixteen bits are shown in FIG. 10 for convenience of illustration. As another example, the destination bit mask could be 00101101b which indicates processors P0, P2, P3, and P5 are available and processors P1, P4, P6 and P7 are not. There are not processors P8-P15 in this example. It could be that only one processor is available. Bits 0 to 31 can give various type of routing information such as whether direct interrupts are involved. "Lowest priority" is shown in FIG. 10 but as mentioned other factors such as power states can be considered, so that strictly speaking it might not be considered a lowest priority selection.

There are several possible implementations that may be used for routing the interrupt within the cluster based on knowledge of the processor power states and priorities. One possible implementation in the "uncore" would use the processor power states knowledge and priorities to provide interrupt routing to enables both power aware interrupt routing that takes performance implications into account. The uncore will have knowledge of the C-state (power saving state) of the processor—these are referred to, for example, as C0, C1, C2, . . . C6— where C0 is the state where the processor (or core) is running code and C1, . . . C6 are idle states where the processor is halted: C1 is the lowest power saving state and C6 is the higher power saving state. Also the latency (and micro-architectural side effects) to get into C1 may be the lowest while those are highest for C6. To provide the highest value from the deeper C-states (such as C6), it may be desirable to allow for processors that have entered a C6 state to stay resident in that state for the longest possible interval. In this possible implementation, the uncore would identify the target by (1) identifying the processors(s) in the lowest numbered C-state and (2) finding the processor with the lowest priority among these processors as the target for the interrupt. There are several ways in which these approaches may be implemented. An implementation can retain a bitmap of the processors in a package in various C-states, AND these against the incoming target bit map and pick the highest or lowest APIC ID in that bitmap as the target. Other implementation details may be used.

Additional Information and Embodiments

The "logic" referred to herein can be implemented in circuits, software, microcode, or a combination of them.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, that A is responsive to B, does not mean it is not also responsive to C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. An apparatus comprising:
   processors including a cluster of processors:
   processor selection logic to receive logical destination identification numbers that are associated with interrupts each having a processor cluster identification number to identify the cluster of processors to which the interrupts are directed, and wherein the logical destination identification numbers are each to identify which processors within the identified cluster of processors are available to receive the corresponding one of interrupts, and
   wherein the processor selection logic is to select at least one of the available processors to receive the interrupt, and wherein the selected at least one of the available processors is identified through a relative position of a corresponding bit in the logical destination identification numbers, and wherein others of the available processors in the identified cluster that are not selected to receive the interrupt, do not receive the interrupt.

2. The apparatus of claim 1, wherein the processor selection logic selects the processor to receive the interrupt responsive to power states of the available processors in making the selections.

3. The apparatus of claim 1, wherein the processor selection logic selects the processor to receive the interrupt responsive to processor priorities of the available processors.

4. The apparatus of claim 1, wherein the processor selection logic selects the processor to receive the interrupt responsive to power states and processor priorities of the available processors in making the selections.

5. The apparatus of claim 1, wherein the cluster is a first cluster and further comprising a second cluster of processors that are among the clusters of processors that the processor cluster identification number may identify, and further comprising a first processor package including the first cluster and a second processor package including the second cluster.

6. The apparatus of claim 5, further comprising a third and fourth clusters of processors that are among the clusters of processors that the processor cluster identification number may identify.

7. The apparatus of claim 1, further comprising a redirection table including entries including the logical destination identification numbers.

8. The apparatus of claim 7, wherein the apparatus includes interface circuitry to interface with devices to provides values that act as indexes into the redirection table.

9. The apparatus of claim 1, wherein some of the logical destination identification numbers identify only one processor as within the identified cluster of processors as being available to receive the corresponding one of interrupts, in which case that one processor is the one selected.

10. The apparatus of claim 1, wherein typically only one of the processors is selected to receive the corresponding interrupt, but in some circumstances more than one processor may be selected to receive the corresponding interrupt.

11. A method comprising:
   determining from a processor cluster identification number which of multiple clusters of processors interrupts are directed to;
   receiving logical destination identification numbers that are associated with the interrupts, and wherein the logical destination identification numbers are each to identify particular processors within the identified cluster of processors as being available to receive the corresponding one of interrupts, and
   selecting at least one of the available processors to receive the interrupt, and wherein the selected at least one of the available processors is identified through a relative position of a corresponding bit in the logical destination identification numbers, and wherein others of the available processors in the identified cluster that are not selected to receive the interrupt, do not receive the interrupt.

12. The method of claim 11, wherein the processor selection logic selects the processor to receive the interrupt responsive to power states and processor priorities of the available processors in making the selections.

13. The method of claim 11, further comprising selecting the logical destination identification numbers through a redirection table.

14. A system comprising:
   processor packages each including at least one cluster of processors; and
   logic to receive interrupts each including processor cluster identification numbers and to direct the interrupts to one of the clusters of processors based on the corresponding processor cluster identification number, and wherein for each of the processor clusters, all of the processors in that cluster are contained in a single processor package; and
   processor selection logic to receive logical destination identification numbers that are associated with the interrupts each having one of the processor cluster identification numbers, and wherein the logical destination identification numbers are each to identify which processors within the identified cluster of processors are available to receive the corresponding one of interrupts, and
   wherein the processor selection logic is to select at least one of the available processors to receive the interrupt, and wherein the selected at least one of the available processors is identified through a relative position of a corresponding bit in the logical destination identification numbers, and wherein others of the available processors in the identified cluster that are not selected to receive the interrupt, do not receive the interrupt.

15. The system of claim 14, further comprising an input output hub that includes a redirection table to provide at least some of the processor cluster identification numbers and at least some of the logical destination identification numbers and wherein the processor selection logic is included in the input output hub.

16. The system of claim 14, wherein the processor selection logic includes a first processor selection sub-logic included in a first one of the processor packages and a second processor selection sub-logic included in a second one of the processor packages.

17. The system of claim 14, wherein the processor selection logic selects the processor to receive the interrupt responsive to power states of the available processors in making the selections.

18. The system of claim 14, wherein the processor selection logic selects the processor to receive the interrupt responsive to processor of the available processors.

19. The system of claim 14, wherein the processor selection logic selects the processor to receive the interrupt responsive to power states and processor of the available processors in making the selections.

20. An system comprising:
   receiving circuitry to receive an interrupt request from a device;
   redirection logic to receive the interrupt request from the device and provide an interrupt message in response to the interrupt request, wherein the interrupt message includes a processor cluster identification number to identify a cluster of processors and a logical destination identification number to identify particular processors within the cluster of processors as being available to receive the interrupt, and wherein the particular processors are identified through relative positions of corresponding bits in the logical destination identification numbers; and
   processor selection logic to receive logical destination identification numbers that are associated with interrupts each having the processor cluster identification number to identify the cluster of processors to which the interrupts are directed, and wherein the logical destination identification numbers are each to identify which processors within the identified cluster of processors are available to receive the corresponding one of interrupts, and
   wherein the processor selection logic is to select at least one of the available processors to receive the interrupt, and wherein the selected at least one of the available processors is identified through a relative position of a corresponding bit in the logical destination identification numbers, and wherein others of the available processors in the identified cluster are not selected to receive the interrupt, do not receive the interrupt.

21. The system of claim 20, wherein for some interrupts only one processor is identified in the logical destination identification number as being available and there is only one corresponding bit in the logical destination identification number.

22. The system of claim 20, wherein the redirection logic includes entries including the logical destination identification numbers.

* * * * *